United States Patent [19]

Dunlap et al.

[11] 4,413,617
[45] Nov. 8, 1983

[54] SOLAR COLLECTOR MODULE

[75] Inventors: Glenn H. Dunlap, Maumee; Wayne J. Zitkus, Toledo, both of Ohio

[73] Assignee: Sunmaster Corporation, Corning, N.Y.

[21] Appl. No.: 362,586

[22] Filed: Mar. 29, 1982

[51] Int. Cl.³ .............................................. F24J 3/02
[52] U.S. Cl. .................................. 126/443; 126/450; 165/178
[58] Field of Search ............... 126/417, 442, 443, 448, 126/450; 165/142, 154, 155, 157, 158, 162, 172, 177, 178

[56] References Cited

U.S. PATENT DOCUMENTS

| | | | |
|---|---|---|---|
| 4,033,327 | 7/1977 | Pei | 165/142 |
| 4,043,318 | 8/1977 | Pei | 165/166 |
| 4,120,285 | 10/1978 | Nugent | 126/443 |
| 4,133,298 | 1/1979 | Hayama | 126/443 |
| 4,212,293 | 7/1980 | Nugent | 126/442 |
| 4,232,655 | 11/1980 | Frissora et al. | 126/450 |
| 4,262,658 | 4/1981 | Frissora | 126/443 |
| 4,304,222 | 12/1981 | Novinger | 126/450 |
| 4,334,523 | 6/1982 | Spanoudis | 126/443 |
| 4,346,694 | 8/1982 | Moan | 126/448 |
| 4,364,373 | 12/1982 | Takeuchi et al. | 126/443 |

Primary Examiner—Daniel J. O'Connor

[57] ABSTRACT

A frame for supporting a parallel array of a plurality of tubular glass solar energy collectors. A transverse manifold, which extends perpendicularly to all the collector tubes, supports one end of each tube and serves also to direct the flow of the heat transfer fluid through the tubes. The manifold is secured to brackets which in turn are secured to longitudinal structural members. A rigid transverse support member is secured to the ends of the longitudinal structural members and mounts the other end of each tube, permitting preassembly of the glass tubes in the frame and installation on a roof as a module. Tension rods between the brackets and the transverse support member prestress the frame and add rigidity.

4 Claims, 6 Drawing Figures

SOLAR COLLECTOR MODULE

BACKGROUND OF THE INVENTION

1. Field of the Invention

The invention relates to a unitary solar collector module comprising a rigid frame and glass collector tubes supported thereby.

2. Description of the Prior Art

Tubular glass collectors for radiant solar energy are becoming increasingly popular as an alternative to flat plate solar collectors. Glass collector tubes such as those employed in the OWENS-ILLINOIS, INC. "Sunpak" system comprise three coaxial glass tubes are disclosed in U.S. Pat. Nos. 4,033,327 and 4,043,318 to Pei and U.S. Pat. No. 4,262,658 to Frissora. The annulus between the inner two tubes contains the heat transfer fluid. The intermediate tube of the three is exposed to solar radiation, and is coated with a solar selective energy absorbing coating. Impinging solar radiation is converted on this surface to thermal energy for heating the fluid inside the intermediate tube. The innermost tube provides for fluid flow into or out of the collector tube. The annulus between the outer and the intermediate tubes is evacuated to prevent convection losses.

A system utilizing such tubes in series includes a manifold directing fluid flow successively from the outlet of one collector tube to the inlet of an adjacent collector tube. See, for example, the aforementioned Pei U.S. Pat. No. 4,033,327. A parallel flow arrangement of collector tubes is shown in the Frissora U.S. Pat. No. 4,262,658. The seals between the openings of the collector tubes and the manifold conduits are maintained by gaskets within the manifold. To prevent leakage in any such systems, a precise alignment of the collector tubes and the manifold is necessary. Heretofore, when installing a glass tube solar collector system on a roof, for example, the manifold has been installed, then the collector tubes were individually mounted and aligned during the installation of the separate frame elements supporting the tubes. In such an installation process, considerable on site skilled work is required.

A modular frame is obviously desirable to facilitate the installation of such a system of glass solar collector tubes. The frame must be lightweight for ease of installation and economy, yet sufficiently rigid to protect the glass collector tubes from excess bending or compressive forces due to mishandling of the frame, such as lifting by a corner, and to maintain the alignment of the tubes and manifold and the integrity of the seals. Furthermore, it is desirable that the frame be attached to an associated roof or other structure at as few points as possible, consistent with a completely secure attachment.

The aforesaid U.S. Pat. No. 4,262,658 to Frissora discloses the use of tension rods between tube support members at either ends of the collector tubes in a conventional installation, but does not disclose a reinforced modular frame.

SUMMARY OF THE INVENTION

The invention provides a modular frame for tubular glass collectors. The frame carrying the tubular collectors may be handled and installed as a unit. The solar collector modular frame comprises a rectangular bolted assemblage of primarily aluminum members, two of which are elongated structural beams. Extending across the beams is a manifold which sealingly receives the open ends of the tubular glass collectors, and comprises conduits for directing the flow of heat transfer fluid through each tube, and upstanding brackets secured to the beams and supporting the conduits.

The other closed ends of the collector tubes are supported by a rigid tube support member which is bolted to the ends of the beams in transverse relation to complete the rectangular frame. Rigidity is imparted to the frame by tension rods which extend between the brackets and the end support members. Hence, the shell of the manifold and the conduits within the manifold need not resist the tensile force of the tension rods, and may therefore be formed of relatively lightweight material.

Other objects, features and advantages of the invention will be readily apparent from the following description of two preferred embodiments thereof, taken in conjunction with the accompanying drawings.

DESCRIPTION OF THE PREFERRED EMBODIMENTS

Figure 1:
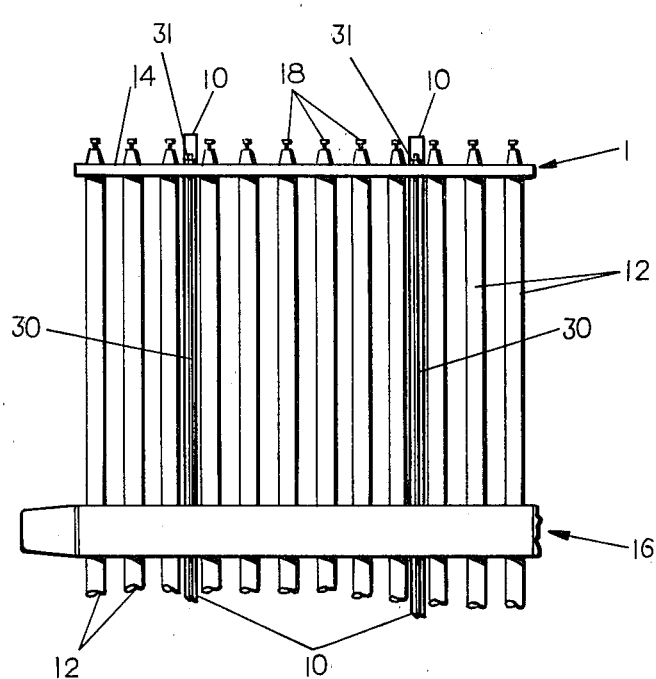
FIG. 1 is a plan view of a modular solar collector and frame embodying the present invention, with one side only of the symmetrical frame shown for purposes of illustration.

A solar collector frame 1 embodying the invention comprises two parallel longitudinal box beams or girders 10, which are parallel to the axes of the solar energy collector tubes 12 whch are mounted in the frame. Two transverse channel shaped end supports 14 are respectively secured by bolts 15 (FIG. 2) to the longitudinal girders 10 in perpendicular relationship and interconnect the ends of the girders 10, thereby forming a rectangular frame. The box girders 10 and channel beam supports 14 are preferably formed of a lightweight, rigid material such as extruded aluminum. Parallel to and located centrally between the end supports 14, an elongated manifold 16 is secured to, and extends transversely from one longitudinal girder 10 to the other girder 10.

In this embodiment the collector tubes 12 supported by the frame 1 are disposed in two sets of parallel, spaced apart tubes. The tubes 12 of the other set are coaxial to the tubes 12 of the first set, and extend between the manifold 16 and the opposite end frame support 14 (FIG. 2).

Each collector tube 12 is of conventional construction and comprises three coaxial glass tubes. The annular space between the outer two tubes is sealed and evacuated to prevent convection losses. The space between the inner tube and the intermediate tube is open at only one end. As one example of the construction under a series flow system, the innermost tube (not shown) is common to two coaxial adjacent collector tubes 12 and extends from the interior of one collector tube 12 through the manifold 16 to the interior of a tube 12 coaxially disposed on the other side of the manifold 16. This arrangement is disclosed in greater detail in the aforementioned U.S. Pat. No. 4,033,327 to Pei. The annular space between the inner two tubes provides a flow path and a space for solar heating of the heat transfer fluid. The innermost tube provides a reversible direction flow path, either into or out of the collector tube 12. Such glass collector tubes are described and illustrated in the aforesaid U.S. Pat. Nos. 4,033,327 and 4,043,318, both to Pei.

Figure 2:
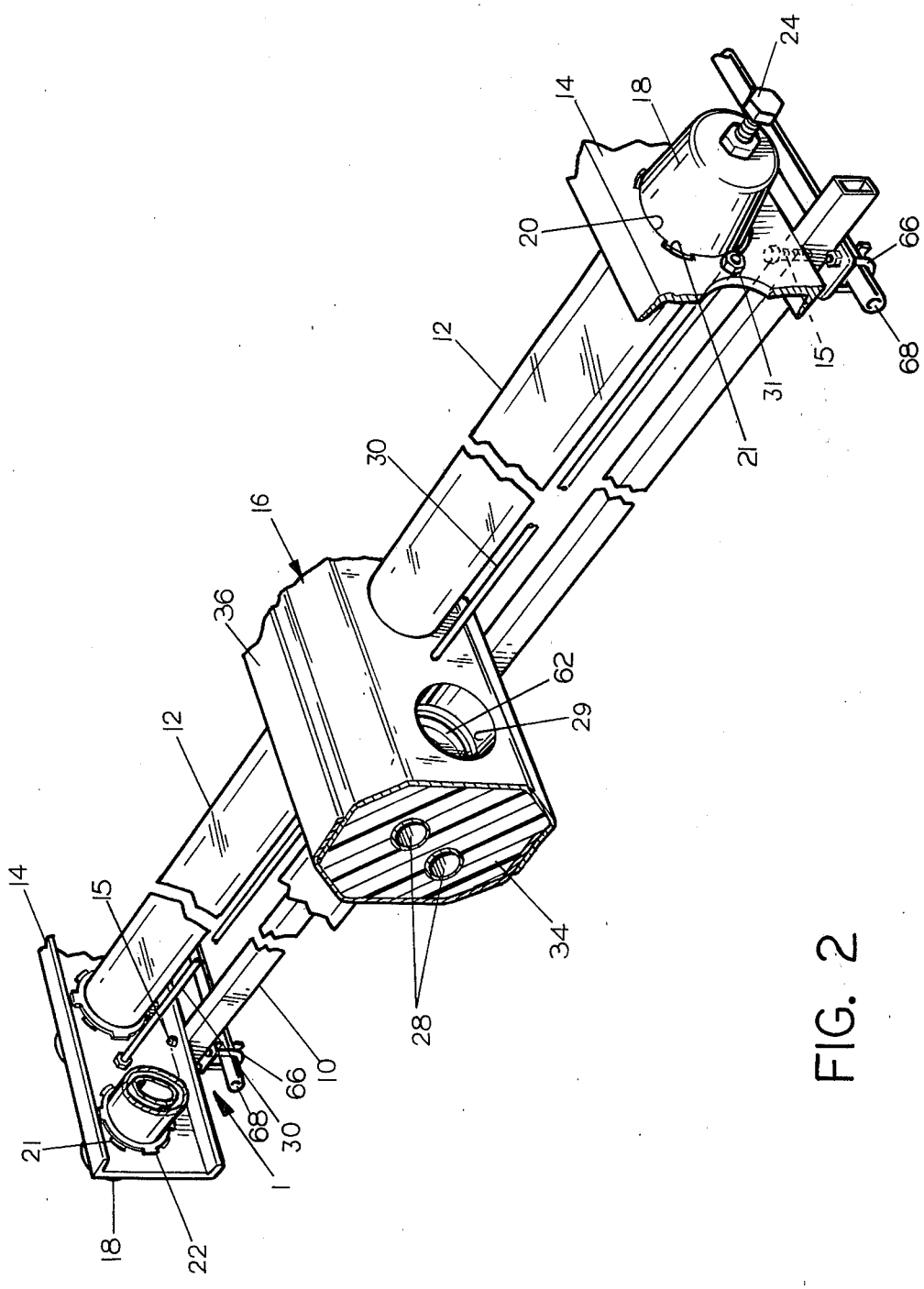
FIG. 2 is a perspective view of the modular solar collector and frame of FIG. 1, partly in section and with portions broken away to illustrate features of the invention.
Figure 5:
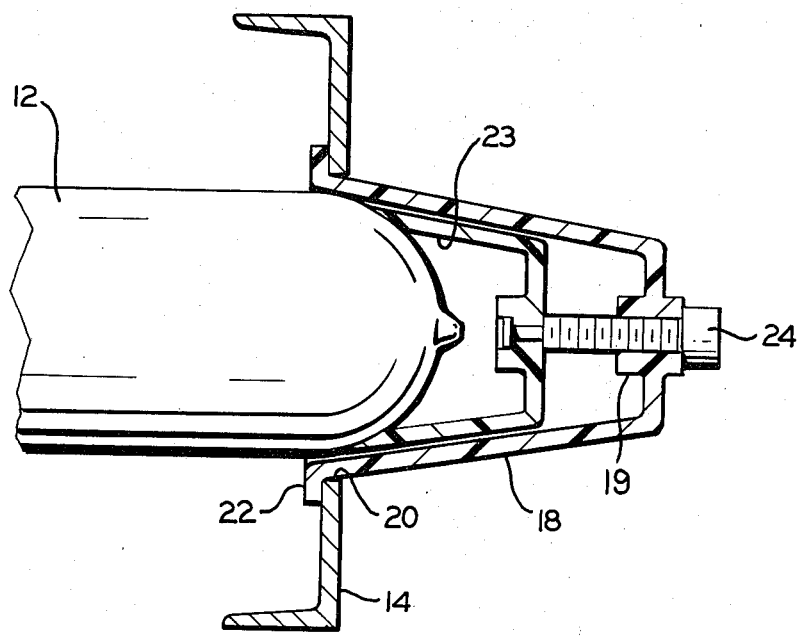
FIG. 5 is a sectional view with parts in section, of an adjustable end cup supporting an end of a collector tube.

Referring now to FIGS. 2 and 5, the closed outer ends of the tubes 12 are supported by a plurality of cups 18 mounted in spaced relationship on the end supports 14. Apertures 20 in the end supports 14 are adapted to receive the cups 18, and include keyways 21 to cooperate with radial flanges 22 on the cups 18. Thus, a cup 18 may be placed over the outer end of a tube 12 and inserted into an aperture 20 from the outside of the frame 1, the flanges 22 being aligned with the keyways 21. When the cup 18 is rotated, the flanges 22 rotate past the keyways 21 to engage the inner surface of the end support member 14, thereby locking the cup 18 into place. The cup 18, associated flanges 22, and the keyways 21 cooperate to provide a bayonet type twist fastener for a collector tube 12.

Means are provided for adjusting the compression of the tubes 12 between the end support 14 and the manifold 16. Thus, as illustrated in FIG. 5, each cup 18 includes an internal liner 23 which may be moved axially by rotation of a bolt 24 axially mounted in the base 19 of cup 18, thereby increasing the axial compressive force on the closed end of the associated tube 12.

Figure 3:
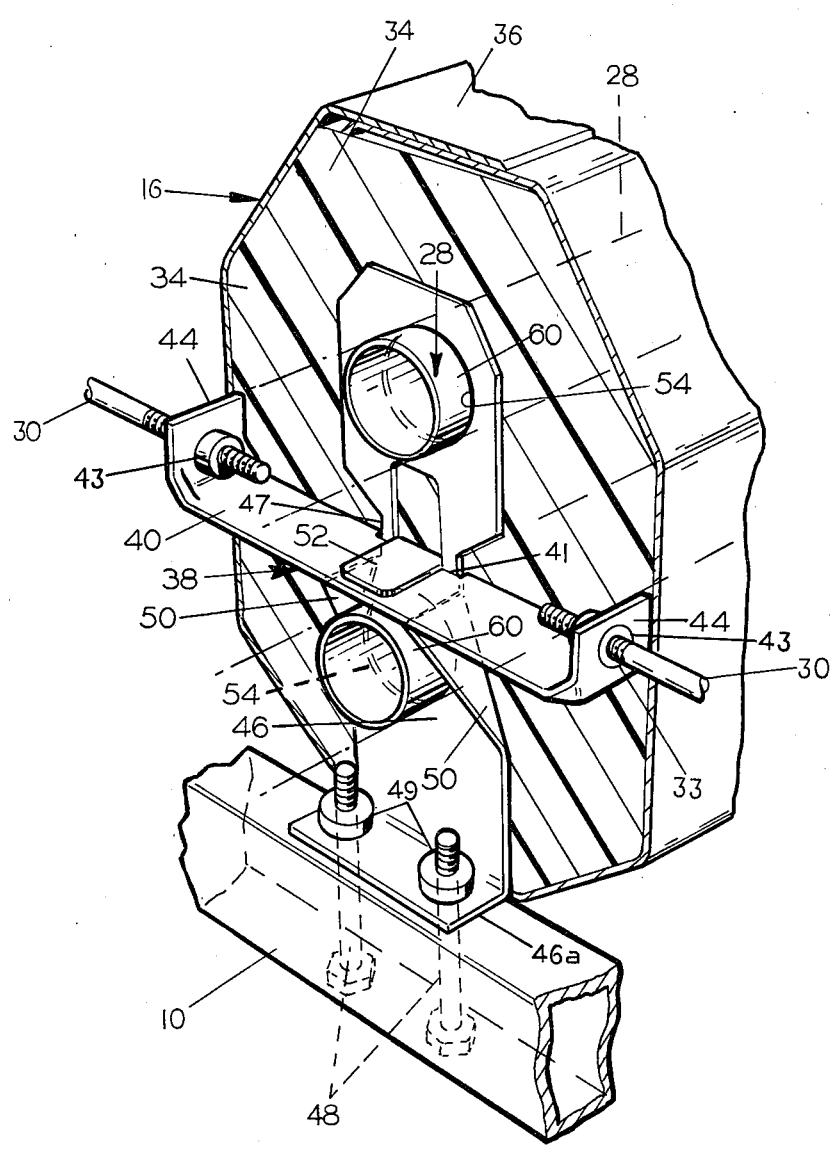
FIG. 3 is a view of the collector manifold, in section, illustrating the bracket for the tension rods.

The inner ends of the tube 12 are supported by the manifold 16. The manifold 16 includes a plurality of sockets 29, each sized and arranged to receive an end of a collector tube 12. As mentioned, the manifold 16 extends from one longitudinal girder 10 to the other, bisecting the frame 1. The manifold 16 is secured to the box girder 10 by bolts 48, which also mounts an upstanding conduit support bracket 46, as illustrated in FIG. 3. The manifold 16 comprises an elongated structure including conduit means 28, foam insulation 34 and an outer shell 36. The insulation may be formed of an expanded polyurethane foam, for example. The outer shell 36 is constructed of sheet metal, glass fiber impregnated plastic, or other lightweight sheet material. Such a manifold is described in detail in the aforesaid U.S. Pat. No. 4,033,327 to Pei.

Figure 4:
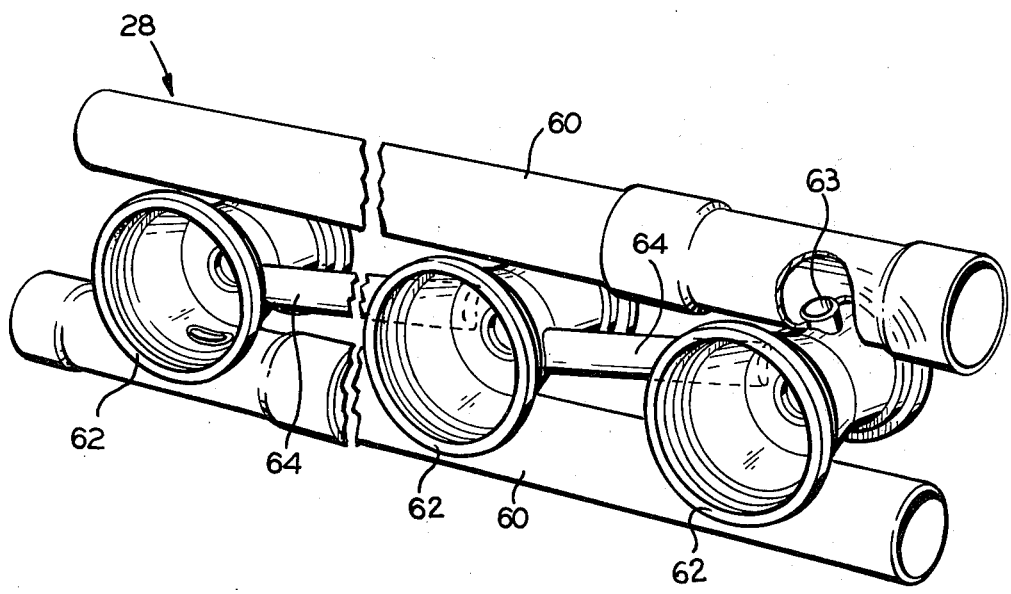
FIG. 4 is perspective view of the manifold conduit means, with the manifold shell and insulation removed for purposes of illustration.

The conduit means 28 shown in FIG. 4 for directing the flow of heat transfer fluid is fully described and illustrated in the aforesaid U.S. Pat. No. 4,033,327. In general, the conduit means 28 includes two parallel, spaced apart header tubes 60 extending the length of the manifold 16 and supported by apertures 54 in mandrel support bracket 46. A series of spaced cups 62 are disposed within the sockets 29 of the manifold 16 and open outwardly to receive ends of respective tubes 12. The cups 62 are arranged in back-to-back pairs, as illustrated in FIG. 4. Cross connecting tubes 64 provide a flow path between adjacent cups. The conduit means 28 is formed of a suitable rigid material, preferably an easily worked metal which is anti-galvanic in a hot environment, such as copper.

When the entire collector module is assembled, each collector tube 12 is in fluid communication with a coaxially adjacent tube through a hole between coaxial back-to-back cups 62, and with a laterally adjacent collector tube 12 through a cross connecting conduit tube 64. As more fully described in the aforementioned U.S. Pat. No. 4,033,327, the conduit means is constructed such that heat transfer fluid flows from an inlet header tube 60 into an end cup 62, successively through each cup 62, collector tube 12 and interconnecting conduit tube 64 to an outlet header tube 60 through a connecting tube 63.

The cups 62 include elastomeric annular gaskets (not shown) for forming seals against associated ends of tubes 12. Adjustment of the screws 24 on the cups 18 on the end support members 14 provides compression of the gaskets necessary to assure a good seal.

To reinforce and rigidify the frame 1, tension rods 30 are disposed between the end frame supports 14 and the manifold 16. One end of each tension rod 30 is secured to an end support member 14 by nuts 31 (FIG. 2). The other end is threadably disposed in a bracket 38 within the manifold 16, as shown in FIG. 3. Typically, the shell 36 is constructed merely to protect the insulation 34 from impact and weather, and to provide for ease of handling. It will not have enough strength to mount the tension rods 30. Therefore, the brackets 38 within the manifold 16 interconnect pairs of tension rods 30 which extend to opposite end support members 14.

The brackets 38, illustrated in detail in FIG. 3, are of U-shaped configuration and preferably formed from stamped steel. Each bracket 38 comprises a horizontal base portion 40 and vertical end tabs 44 located adjacent the inside surface of the manifold shell 36. Each bracket 38 is supported by out-turned flanges 50 and 52 formed on conduit support bracket 46. A notch 41 in base portion 40 straddles a center portion 47 of support bracket 46. Each tension rod 30 extends through a hole in the manifold shell 36 and is threadably disposed in an internally threaded bushing 43 which is press fitted or otherwise mounted in end tab 44. Thus, the two end support members 14 are interconnected by pairs of coaxial tension rods 30, the rods of each pair being connected through link 40 within the manifold shell 36. As mentioned, the support bracket 46 is attached to the longitudinal frame member 10 by means of bolts 48 which extend through the shell 36 of the manifold 16 to engage threaded bushings 49 which are appropriately mounted in a support flange 46a formed on the bottom of bracket 46. The support bracket 46 is also provided with holes 54 through which the header tubes 60 of the manifold conduit 28 extend. Therefore, the support bracket 46 maintains the frame member 10, the conduit 28, and the tension rods 30 in alignment.

During assembly of the modular solar collector, the tubes 12 are inserted between the manifold cups 62 within the sockets 29 and the respective end support member 14. The tube supporting cups 18 are locked into place on the end support members 14, as described above. Tension on the rods 30 is adjustable by means of the nuts 31.

The assembled solar collector module may be handled and transported as a unit for attachment to a supporting structure in any convenient manner. In FIG. 2, U-bolts 66 are illustrated securing the frame 1 to supporting bars 68 which would typically be secured to a southern facing roof, for example.

Figure 6:
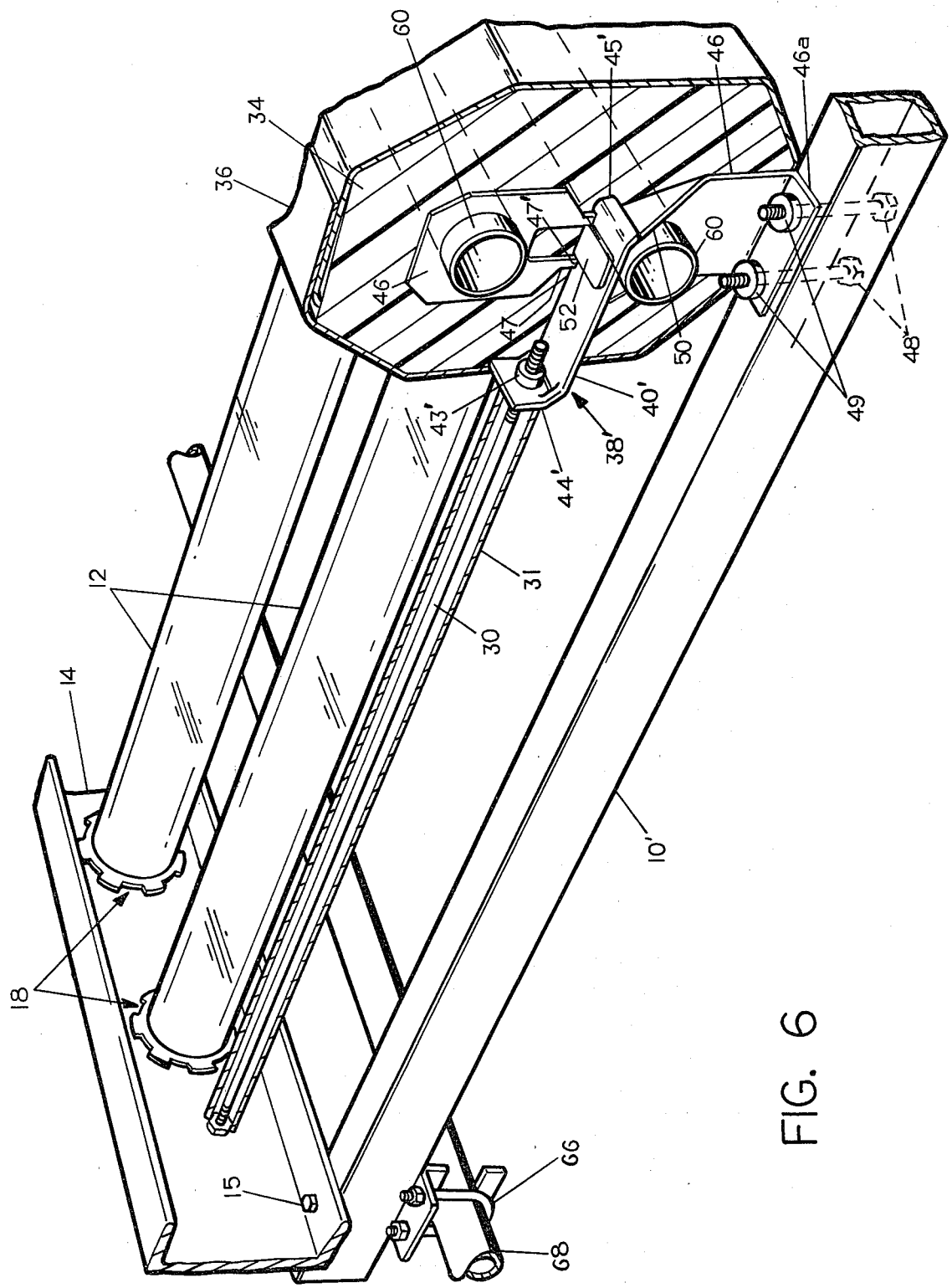
FIG. 6 is a perspective view of a modified solar collector frame embodying the present invention.

In the event that it is desired to employ a simpler configuration of collector tubes 12, and in particular, an array comprising a single set of tubes disposed in parallel relationship, then the frame structure disclosed in FIG. 6 may be advantageously employed. Identical numerals in FIG. 6 indicate parts identical to those in FIGS. 1-5. Thus, the same transverse end support element 14 is employed in this embodiment as was utilized in the embodiment of FIGS. 1-5, and the closed ends of collector tubes 12 are supported in the transverse end support element 14 by cups 18 in the same manner as previously described.

The longitudinal girder elements 10' are of the same cross sectional configuration as those employed in the previous modification, but are of shorter length since only a single length of collector tubes 12 are to be mounted in the frame. The upstanding manifold support brackets 46 secured to girder elements 10' are of the same configuration as previously described, and the conduits 60 are supported by brackets 46 in the same manner as previously described. The fluid connections between such conduits and tubes 12 may provide for either a series flow of heat transfer fluid through the successive collector tubes 12 as described, or a parallel flow, in a manner well known in the art.

The major element changed is the means for anchoring the tie rods 30 which extend between the upstanding manifold support brackets 46 and the transverse end support element 14. Tie rods 30 are secured to a vertical flange portion 44' of a horizontally disposed connecting bracket 38'. The bracket 38' has a horizontal portion 40' which is positioned between the outwardly directed flanges 50 and 52 formed on the upstanding manifold support bracket 46. The other end 45' of the connecting bracket 38' is downturned so as to engage the side wall of the inturned flange 50. A notch 47' is provided in the side wall of the horizontal portion 40' of connecting bracket 38' and snugly engages the central portion 47 of the upstanding connecting bracket 46.

Thus, the forces exerted by applying tension to the tension rods 30, through the threaded engagement of such rods with an internally threaded collar 43' carried by the vertical flange portion 44' of the connecting bracket 38', will be transmitted to the upstanding bracket 46 and thus to the longitudinal beam elements 10' to which the brackets 46 are secured by bolts 48.

To further rigidify the frame, compression tubes 31 may be placed in surrounding relation to tie rods 30. Stressing the rods 30 compresses tubes 31 between bracket 46 and end support member 14.

It is therefore apparent that both embodiments of this invention provide an extremely lightweight, readily assembled frame for supporting the collector tubes in a desired array as a module ready for attachment to a roof. In either embodiment of the invention, the application of tension to the tension rods 30 has the effect of rigidifying the entire frame structure so that when it is mishandled in any manner, such as by lifting only one corner of the frame, no undue compression or bending forces are imparted to the glass collector tubes 12.

While the invention has been described in detail with reference to two preferred embodiments, it should be understood that modifications may be made without departing from the scope of the invention as defined by the appended claims.

What is claimed is:

1. A frame for mounting solar collector tubes in a parallel array, the solar collector tubes having fluid inlet and outlet openings in only one end, comprising at least two elongated, parallel girder elements rigidly connected at their one ends by a rigid transverse tube support member, said girder elements being parallel to the desired alignment of the solar collector tubes, a manifold disposed transversely to said longitudinal girder elements, vertical brackets in said manifold secured to said girder elements, inlet and outlet fluid conduits supported by said vertical brackets, means in said manifold for respectively sealingly mounting the open ends of the solar collector tubes in fluid communication with said inlet and outlet conduits, means in said tube support member for supporting the other ends of the solar collector tubes, and a frame rigidifying tie rod disposed in parallel relationship to each girder element, means for securing one end of each said tie rod to said tube support member, means for securing the other end of each tie rod to said vertical bracket, at least one of said securing means being threadably adjustable, thereby permitting a selected degree of tensile stress to be imposed on said tie rods to rigidify the frame during handling and installation.

2. The apparatus of claim 1 plus a plurality of said solar collector tubes mounted in said frame prior to roof installation, thereby providing a solar collector module for unitary installation.

3. The apparatus of claim 1 or 2 wherein said means for securing said tie rod to said vertical bracket comprises a second bracket detachably secured to said vertical bracket.

4. The apparatus of claim 1 or 2 wherein said means for securing said tie rods to said vertical brackets comprises a generally horizontally disposed bracket having a vertically disposed end flange apertured to receive said tie rod, and flange means formed on each said vertical bracket for securing said horizontal bracket thereto.

* * * * *